(12) United States Patent
Intelisano (10) Patent No.: US 9,450,467 B2
(45) Date of Patent: Sep. 20, 2016

(54) SUBMERSIBLE PUMP

(71) Applicant: Craig Intelisano, Bradenton, FL (US)

(72) Inventor: Craig Intelisano, Bradenton, FL (US)

(73) Assignee: SUMMIN HOLDING COMPANY, LLC, Cheyenne, WY (US)

( * ) Notice: Subject to any disclaimer, the term of this patent is extended or adjusted under 35 U.S.C. 154(b) by 461 days.

(21) Appl. No.: 13/826,589

(22) Filed: Mar. 14, 2013

(65) Prior Publication Data

US 2014/0271271 A1   Sep. 18, 2014

(51) Int. Cl.
| | | |
|---|---|---|
| H02K 5/132 | (2006.01) | |
| F04B 17/03 | (2006.01) | |
| F04B 53/16 | (2006.01) | |
| F04B 47/02 | (2006.01) | |
| H02K 5/22 | (2006.01) | |

(52) U.S. Cl.
CPC .............. *H02K 5/132* (2013.01); *F04B 17/03* (2013.01); *F04B 47/02* (2013.01); *F04B 53/16* (2013.01); *H02K 5/225* (2013.01); *Y10T 29/49236* (2015.01)

(58) Field of Classification Search
CPC ..... E02D 1/06; E21B 43/124; E21B 49/084; F04D 13/10; F04D 17/03; G01N 1/10; G01N 1/14; H02K 5/132; H02K 5/225
USPC .............. 166/66.4, 69, 105, 264; 417/423.3, 417/423.15; 310/71
See application file for complete search history.

(56) References Cited

U.S. PATENT DOCUMENTS

| | | | | |
|---|---|---|---|---|
| 2,320,708 A | * | 6/1943 | Yost ...................... | F04D 13/086 277/369 |
| 2,701,529 A | * | 2/1955 | Finzel ................... | F04D 13/086 417/423.3 |
| 4,508,987 A | * | 4/1985 | Ladusaw ............ | H02K 11/0047 310/68 C |
| 4,961,018 A | * | 10/1990 | Akhter ................ | F04D 15/0218 310/71 |
| 5,113,101 A | * | 5/1992 | Liu ..................... | H01R 13/5221 174/75 D |
| 5,669,763 A | * | 9/1997 | Pryce .................... | F02M 37/10 417/313 |
| 6,409,485 B1 | * | 6/2002 | Ebner ................... | E21B 17/028 310/87 |
| 7,108,489 B2 | * | 9/2006 | Yap ........................ | F01C 21/10 417/410.1 |
| 7,584,785 B2 | * | 9/2009 | Intelisano ................ | E02D 1/06 166/105 |

* cited by examiner

*Primary Examiner* — Patrick Hamo
(74) *Attorney, Agent, or Firm* — RatnerPrestia (57) ABSTRACT

A replaceable motor module for a groundwater sampling device including an inner housing defined by a cylindrical shape and having a first alignment pin. A DC-operated electric motor is positionable within the inner housing, and includes a first set of electrical input terminals, an output shaft capable of downwardly extending through a sealed hole in the inner housing, and a first alignment groove for mating with the first alignment pin of the inner housing. An inner housing cap includes a second set of electrical input terminals and electrical output terminals, and is pressingly engageable with the inner housing.

8 Claims, 7 Drawing Sheets

SUBMERSIBLE PUMP

FIELD OF THE INVENTION

The present invention relates to sampling devices and pumps for the gathering or recovery of liquid samples from groundwater or other liquid bodies.

BACKGROUND OF THE INVENTION

Submersible pumps, supported by electrical leads and one or more conduits for fluid flow, may be descended into a pre-established well or other water source. The electrical leads provide a means to control the submersible pump, and the liquid conduit provides means to transfer the liquid from the source to the surface for removal or further analysis. A submersible pump of this type is described in U.S. Pat. No. 7,584,785 to Intelisano, the contents of which patent are hereby incorporated by reference.

One known use of submersible pumps is the testing for, and removal of, contaminants found in liquid bodies. The removal of subsurface contaminants that exist in aquifers and other water sources remains a high national priority. Contaminants of concern span various man-made volatile organic compounds such as chlorinated hydrocarbons and chlorinated olefins (i.e., tetrachloroethylene, trichloroethylene, cis 1,2-dichloroethane and vinyl chloride). Other compounds of interest include, e.g., aromatic or polyaromatic ring compounds such as benzene, toluene, methylbenzene, xylenes, and naphthalene.

Submersible pumps are subject to potential mechanical failure due to design inefficiencies (e.g., overheating failures related to an inability to effectively dissipate pump heat generation), as well as due to the harsh environmental conditions encountered in subterranean atmospheres (e.g., system strain due to significant turbidity). Maintenance or replacement of the submersible pump assembly can be disruptive as it may cause significant downtime. Moreover, replacement of the entire pumping assembly, typically required upon failure of the pump motor, may be costly.

Accordingly, there exists a need for a submersible pump for, e.g., groundwater sampling, which is readily serviceable by the quick and convenient removal and replacement of the motor contained therein and for enhanced flow and cooling characteristics around the motor for extended life.

SUMMARY OF THE INVENTION

Aspects of the present invention relate to submersible pumps for withdrawing water from a water source.

In accordance with one aspect of the present invention, a replaceable motor module for a groundwater sampling device is disclosed. The replaceable motor module includes an inner housing. The inner housing is defined by a cylindrical shape and has a first alignment pin. A DC-operated electric motor is positionable within the inner housing. The DC-operated electric motor includes a first set of electrical input terminals, an output shaft capable of downwardly extending through a sealed hole in the inner housing, and a first alignment groove capable of mating with the first alignment pin. An inner housing cap including electrical output terminals and a second set of electrical input terminals is pressibly engageable with the inner housing.

In an exemplary embodiment, a method of assembling a groundwater sampling device is provided. The method includes aligning an alignment groove of an inner housing comprising a DC-operated electric motor within said inner housing, the motor including a first set of electrical input terminals and an output shaft downwardly extending through a sealed hole in the inner housing, with an alignment pin of an inner housing cap comprising a second set of electrical input terminals and electrical output terminals. The method further includes fixedly securing the inner housing to the inner housing cap.

In another embodiment, a motor module cap for a replaceable motor module for a groundwater sampling device is provided. The motor module cap includes an output cap having a fluid conduit, a first set of lead bores for receiving electrical leads and a first plurality of holes for receiving an equal number of fasteners. A compression disc is substantially annular in shape, and includes a second set of lead bores for receiving electrical leads and a second plurality of holes for affixing the compression disk to the output cap, the second set of lead bores having a diameter equal to or less than the diameter of the first set of lead bores. The compression disc is affixed to the output cap such that the first set of lead bores is in alignment with the second set of lead bores and the first plurality of holes is in alignment with the second plurality of holes.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Figure 1:
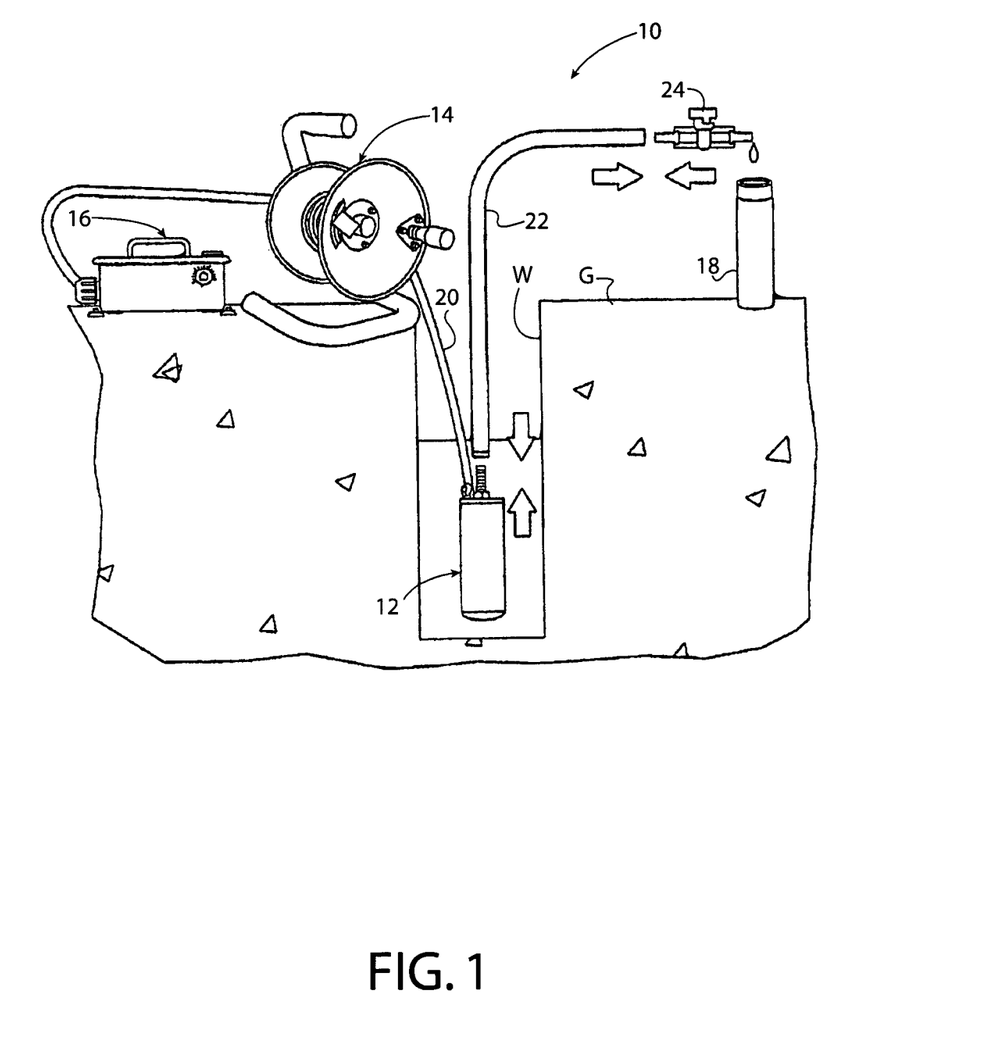
FIG. 1 is a simplified pictorial view of the system of the invention.
Figure 2:
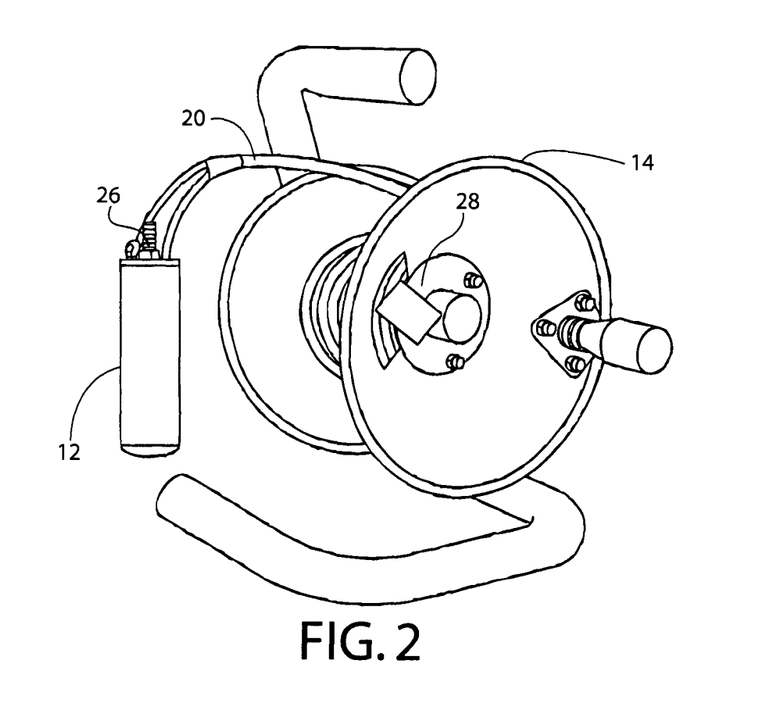
FIG. 2 is a perspective view of a groundwater sampling device and the associated above-ground electrical conduit reel apparatus.
Figure 3:
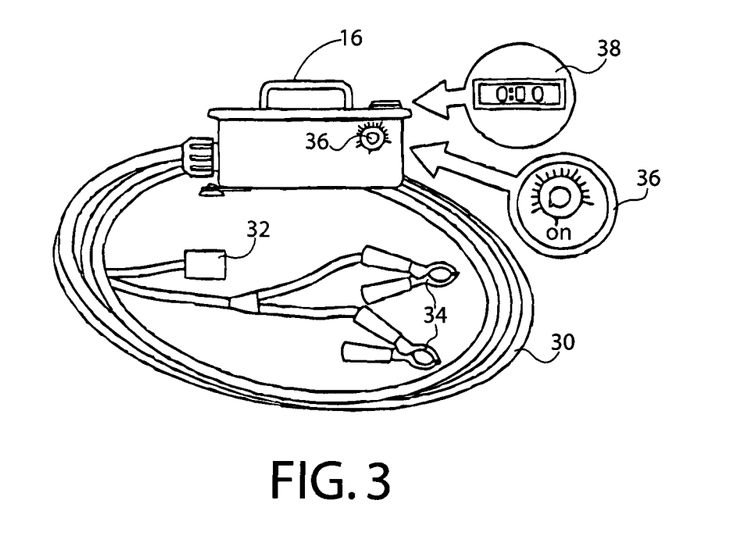
FIG. 3 is a perspective view of the power booster/controller of the system.

The various aspects of the present invention relate generally to a replaceable motor module for a groundwater sampling device. Referring now to the drawings, FIGS. 1, 2, and 3 illustrate the basic characteristics of the inventive system, which includes water sampling device 100 in the form of a submersible groundwater pump, an electrical conduit reel apparatus 14 which interconnects a voltage controller/booster device 16 to the water sampling device 100, and further includes a sample vial 18 into which the groundwater is pumped out of a pre-established well W through water conduit 22 for collection.

The device 100 is described in more detail below and is positionable within the well W formed into the ground below grade level G. The depth of device 100 is controlled primarily by the feeding of the electrical conduit 20 from reel apparatus 14. The system voltage/current controller/booster 16 includes a connection to electrical conduit 20 through the attachment of the fitting 32 to the mating fitting 28 connected to reel apparatus 14. Electrical contacts 34, which are attachable to the terminals of a low voltage d.c. electrical power source such as a 12-volt battery, provide the power input into controller 16. By the adjustment of the variable voltage adjuster 36, which is monitored by the liquid crystal display 38, voltage output from controller 16 into the motor module contained within device 100 is provided.

Controller 16 inputs direct current from the 12-volt battery and produces an output voltage to run device 100 within specified parameters. Controller 16 boosts the voltage up to 40 volts and then, using a buck converter, puts out a selected fixed voltage to the pump to operate device 100 at the selected parameters. Consideration is given to the effective wire loss to maximize water output or pressure head that can be pumped.

When device 100 is activated, groundwater is forced upwardly through flexible conduit 22, through a disposable valve 24 for dispensing a controlled volume of groundwater into a VOA vial 18. Alternatively, the system 10 may be used to simply evacuate groundwater from a pre-established well W, in which case the upper end of conduit 22 is directed to discharge the groundwater into, e.g., a suitable container or an above-ground basin. Embodiments of system 10 are currently available commercially through Proactive Environmental Products of Bradenton, Fla.

Figure 4:
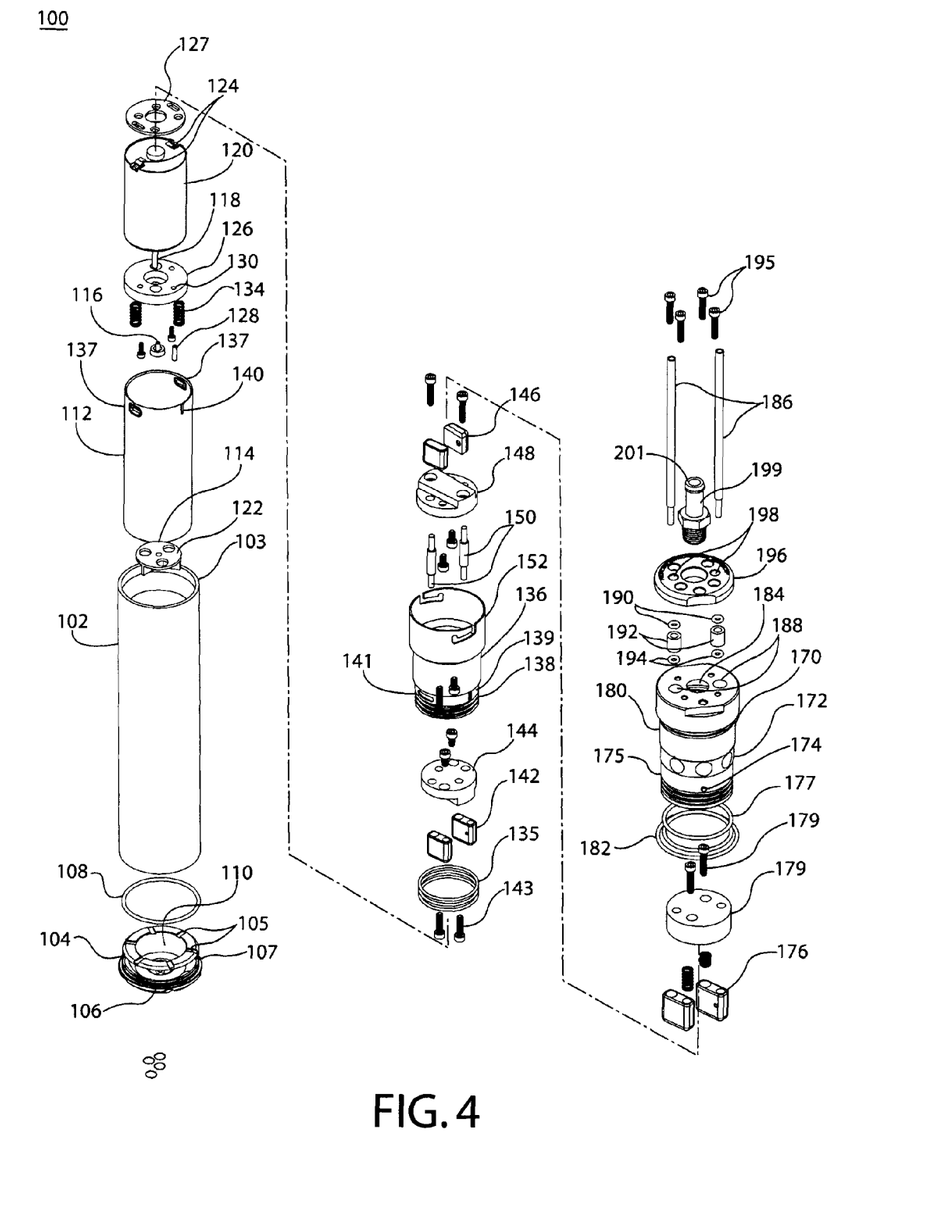
FIG. 4 is a three dimensional exploded view of an exemplary groundwater sampling device in accordance with aspects of the present invention.

Turning next to FIG. 4, an exemplary groundwater sampling device 100 is provided in more detail. Unless otherwise provided, the components of device 100 are generally formed (e.g., machined and/or molded) of substantially non-corrosive material, such as PVC, polyethylene, polypropylene, ABS, TEFLON® or stainless steel. An outer cylindrical housing 102 formed of such material and having thin walls and a hollow interior includes threads for mating with bottom portion 104. The mating of outer housing 102 and bottom portion 104 is made water-tight through the incorporation of an o-ring 108, which is seated on bottom portion 104. Bottom portion 104 may be formed as a segment sphere (or it may be flat) and includes, at the distal end of bottom portion 104, a filter screen 106, which includes one or more inlet ports arranged as shown or in other configurations as would be apparent to one of ordinary skill in the art. Filter screen 106 leads to an interior chamber 110 into which groundwater is drawn.

Interior chamber 110 is defined by a circumferential ridge 107 on bottom portion 104. Grooves 105 are arranged on the proximal most edge of circumferential ridge 107. Circumferential ridge 107 of bottom portion 104 abuts the base 114 of the inner housing 112. As will be described in greater detail below, grooves 105 permit the flow of fluid from the interior chamber 110 to a clearance gap 125 between inner housing 112 and outer housing 102.

Seated within the hollow interior of outer housing 102 is inner housing 112 having a cylindrical tubular shape (i.e., having a hollow interior similar to outer housing 102). Base 114 of inner housing 112 includes an opening containing an annular seal 116. Annular seal 116 receives an output shaft 118 of a d.c. motor 120 upon placement of d.c. motor 120 within inner housing 112. A water impeller 122 is attached to output shaft 118 and resides, upon assembly, within or above interior chamber 110 and above filter screen 106. A clearance gap 125 is established between the inner diameter of outer housing 102 and the outer diameter of inner housing 112 to define a water passageway or "jacket" through which fluid can upwardly travel towards an output cap 170 containing a fluid conduit 172.

The top of motor 120 includes two electrical input terminals 124 which receive d.c. current and voltage from controller 16 through electrical conduit 20 as will be described in more detail below. A thin plastic disc 127 is fastened to motor 120 by electrical input terminals 124 and acts as a quality control device which indicates tampering with motor 120. Thin plastic disc 127 also eliminates electrical interference between motor 120 and the output contact blocks 142.

Figure 8:
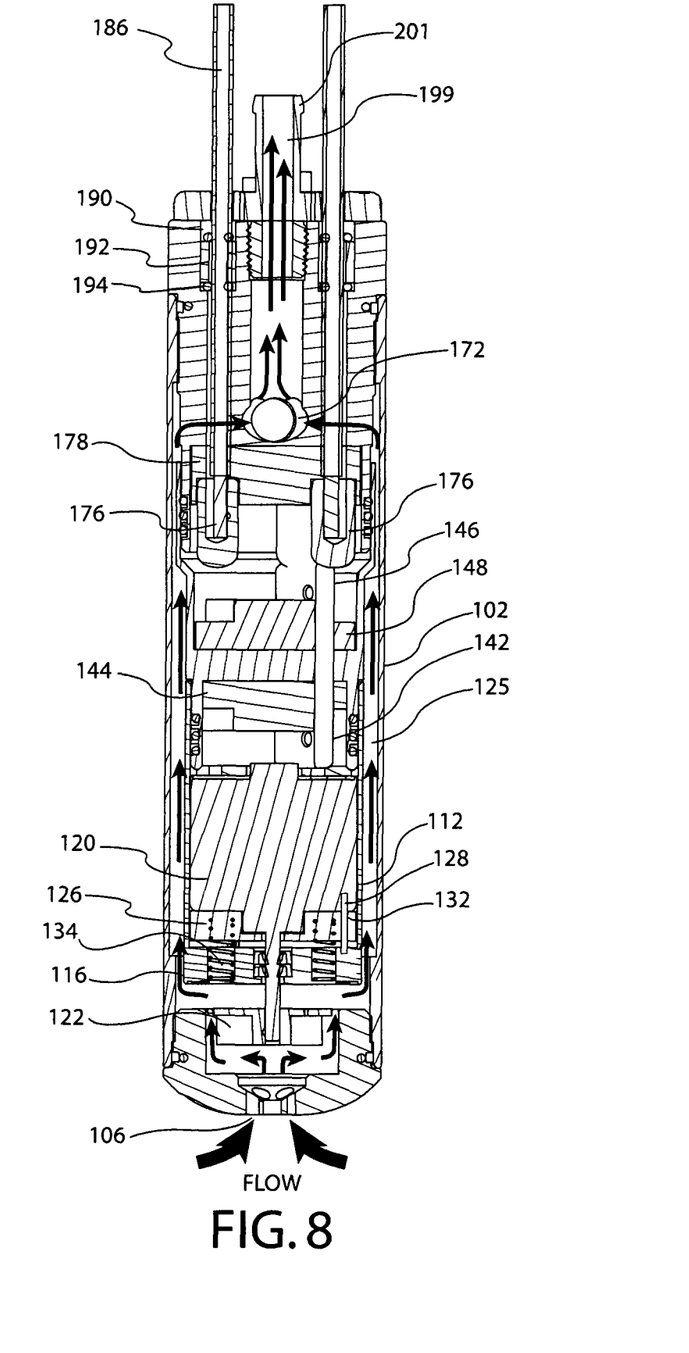
FIG. 8 is a cross-sectional view of an exemplary groundwater sampling device in accordance with aspects of the present invention.

Referring back to FIG. 4, output shaft 118 passes through an annular spacer 126, which is positioned below the bottom of motor 120 and inside of inner housing 112. Annular spacer 126 further contains an opening 130 for receiving an alignment pin 128. Turning briefly to FIG. 8, alignment pin 128 is fixedly attached to base 114 of inner housing 112, passes through opening of annular sparer 126, and is received by an aperture 132 of motor 120. Alignment pin 128 establishes the proper rotational alignment and immobilization between motor 120 and inner housing 112. In one embodiment, springs 134 may exert an upward force upon annular spacer 126 to further stabilize motor 120 and to keep electrical inputs 124 in contact with the d.c. power source.

An inner housing cap 136 may include one or more o-rings 135 (three are shown in FIG. 4) positioned at the base (i.e. proximal) portion 138 of inner housing cap 136. Inner housing cap 136, forms a water-tight seal with inner housing 112 by way of o-rings 135 after base 138 is inserted into inner housing 112. Preferably, a proper rotational alignment is established between inner housing cap 136 and inner housing 112 in order to align protrusions 137 on inner housing with receiving gaps 141. In one embodiment, upon the mating of protrusions 137 with receiving gaps 141, an inward force applied to protrusions 137, such as provided by a pneumatic press, engages protrusions 137 with receiving gaps 141, thereby fixedly attaching inner housing cap 136 to inner housing 112. Alternatively, protrusions 137 can extend radially towards the longitudinal axis of inner housing 112 such that protrusions 137 snap into receiving gaps 141.

The proper rotational alignment between inner housing cap 136 and inner housing 112 may also be established by way of a cap alignment pin 139, which may be located on base portion 138, and an inner housing notch 140, located at the top of inner housing 112. In one embodiment, cap alignment pin 139 mates with inner housing notch 140. One of ordinary skill in the art will understand that other arrangements may be used to establish alignment and connection between inner housing 112 and inner housing cap 136 (such as, e.g., reversing the above described embodiment by providing a notch on inner housing cap 136 and an alignment pin at the top of inner housing 112).

Proper rotational alignment permits mechanical and electrical contact between electrical input terminals 124 of d.c. motor 120 and two output contact blocks 142. Output contact blocks 142 may be seated within slots formed into a non-conductive accurately configured spacer 144, which itself is held in position inside of base portion 138 by threaded fasteners 143.

Input contact blocks 146 may be similarly seated into slots formed into a non-conductive spacer 148 which, as shown in FIG. 4, may be positioned inside the distal portion of inner housing cap 136. Electrical and mechanical contact may be established between input contact blocks 146 and output contact blocks 142 by way of an electrical conduit, shown in FIG. 4 as two wire portions 150.

Output cap 170, also formed of machined material, includes outwardly extending pins 174 which lockably engage into L-shaped slots 152 formed into inner housing cap 136. Following axial movement together with the pins 174 properly aligned with the longitudinal portions of these L-shaped slots 152, a simple twisting action seals and locks output cap 170 into engagement with the upper end of inner housing cap 136. Upon reading the teachings contained herein, other manners of attaching output cap 170 and inner housing cap 136 will become apparent to those having ordinary skill in the art.

Output cap 170 further includes, at a base portion 175, a plurality of o-rings 177 that allow a water-tight seal between output cap 170 and inner housing cap 136 upon lockably engaging these two components. Within base portion 175, output contact blocks 176 may be seated within slots formed into a non-conductive accurately configured spacer 178. Configured spacer 178 is held in position inside of base portion 175 by threaded fasteners 179. Electrical and mechanical contact between output contact blocks 176 and input contact blocks 146 is established as a result of lockably engaging output cap 170 and inner housing cap 136.

Figure 5:
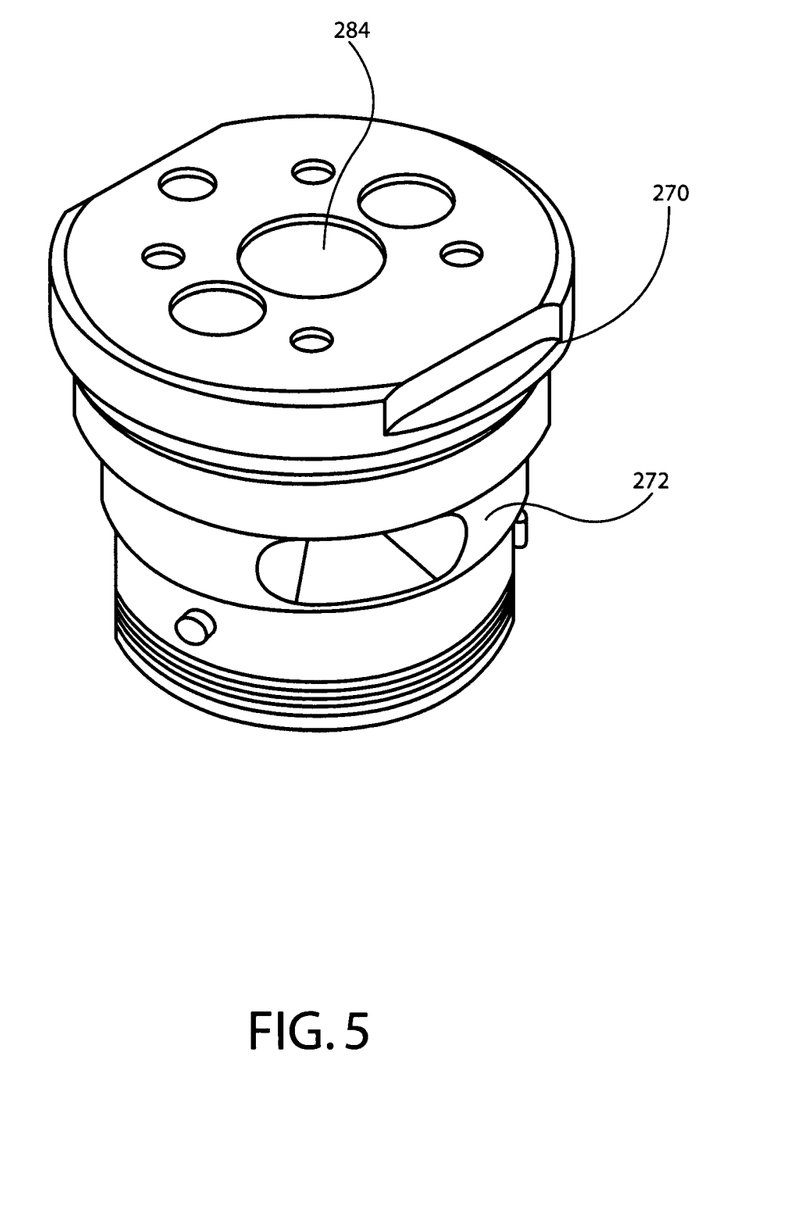
FIG. 5 is a three dimensional view of a motor module cap for a replaceable motor module for a groundwater sampling device in accordance with aspects of the present invention.
Figure 6:
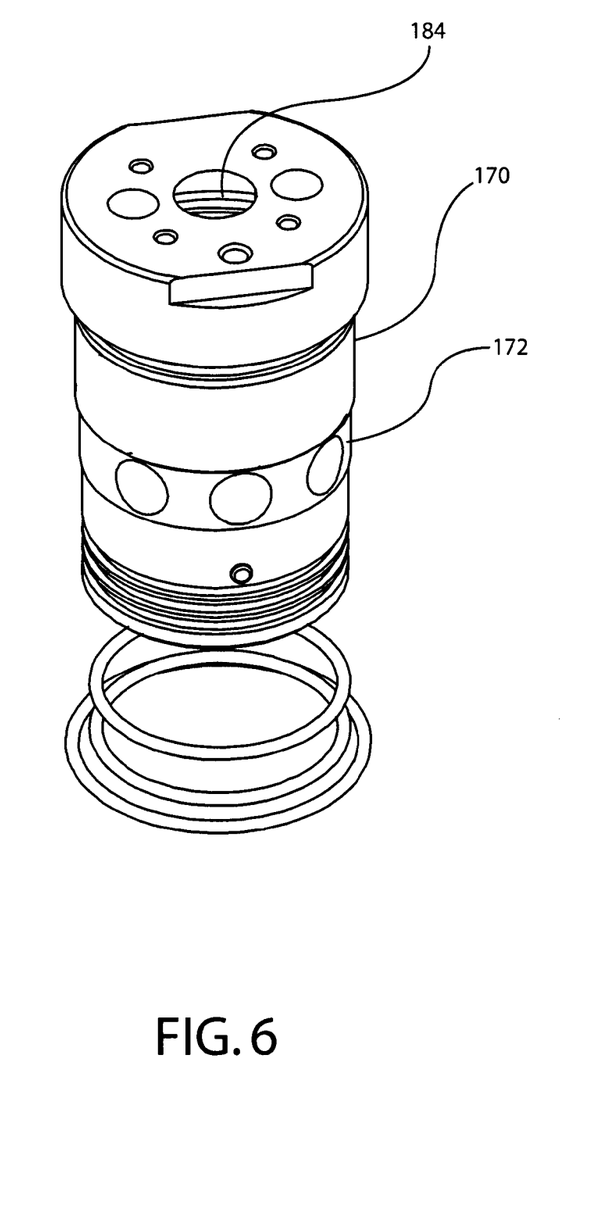
FIG. 6 is a three dimensional view of a motor module cap for a replaceable motor module for a groundwater sampling device in accordance with aspects of the present invention.

At distal portion of output cap 170, a fluid output passage 184 is a longitudinal passage within output cap 170 which is in fluid communication with fluid conduit 172. In one embodiment, fluid conduit 172 radially extends from the base of fluid output passage 184 (i.e., fluid flows into fluid conduit 172 in a radial direction towards fluid output passage 184, at which point the fluid flow is re-directed longitudinally upwards towards the distal portion of output cap 170). In FIG. 4, fluid conduit 172 includes a series of radial passageways which intersect with fluid output passage 184. Turning briefly to FIG. 5, an alternative embodiment is shown in which fluid conduit 272 penetrates completely through output cap 270, forming an "hour glass" shape in which the circumference of the fluid passage (on both sides of output cap 270) is gradually restricted until intersecting with fluid output passage 284 at the center point of the hour glass. The hour glass configuration, which is incorporated in, e.g., the SS Mega-Typhoon® and the SS Mini-Monsoon®, available commercially from Proactive Environmental Products of Bradenton, Fla., provides increased head pressure and, accordingly, an increased flow rate. Additionally, this configuration facilitates cleaning this region.

Returning to FIG. 4, also at distal portion of output cap 170, two longitudinal bores 188 provide access to output contact blocks 176. Electrical conduit 20, shown specifically in this case as electrical leads 186, passes through longitudinal bores 188. Preferably, the ends of electrical leads 186 are stripped of insulation to expose the conductive interior wiring and then affixed (e.g., clamped, soldered, or otherwise mechanically attached) within mating holes formed into output contact blocks 176. In one embodiment, additional deterrence of fluid flow into bores 188 is accomplished through the use of one or more o-rings positioned around electrical leads 186. As shown, a configuration having an o-ring 190 above a spacer 192, which is above a second o-ring 194, is employed for each lead 186. Preferably, o-ring 190, spacer 192, and second o-ring 194 surround each lead 186 within bores 188.

Figure 7A:
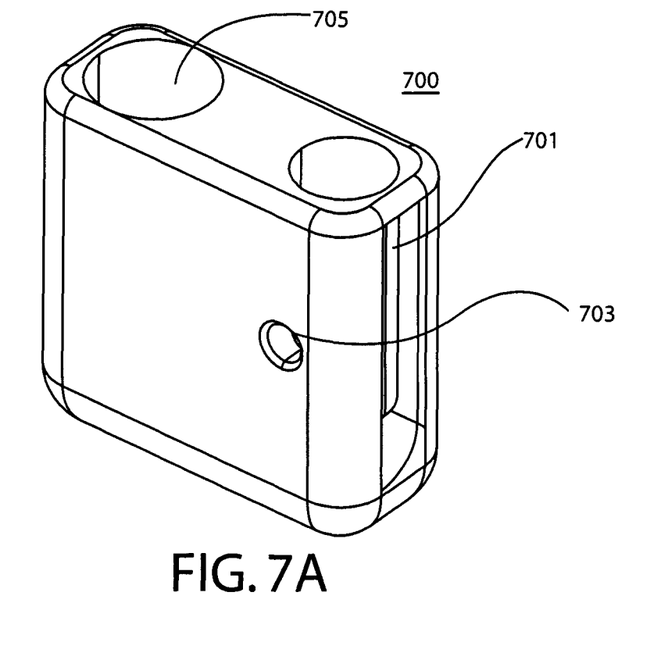
FIGS. 7A and 7B are three dimensional perspective views of a contact block for a groundwater sampling device in accordance with aspects of the present invention.
Figure 7B:
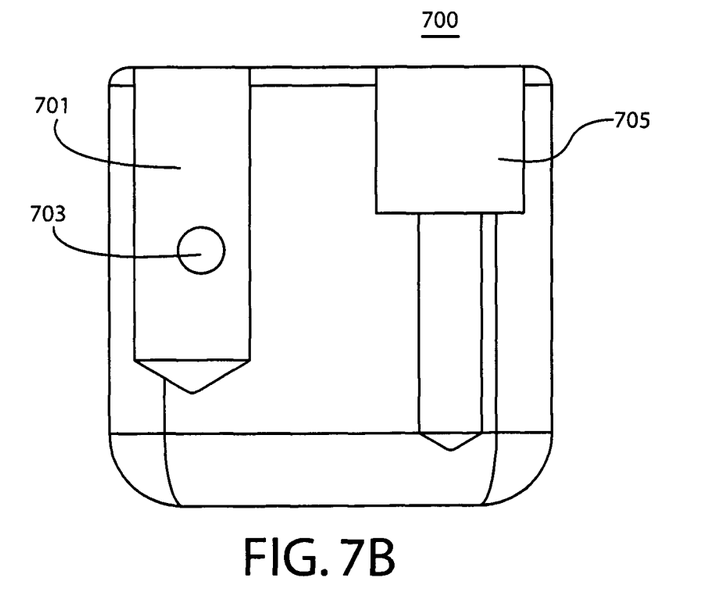

Further ensuring against fluid access to interior electrical components via bores 188, each contact block (i.e. output contact blocks 176, input contact blocks 146, and output contact blocks 142) may be machined such that only a partial bore is created for receiving the electrical conduit and for receiving fasteners. That is, in this alternative embodiment of the invention, no contact block contains a bore which passes completely through the contact block. An exemplary contact block incorporating these "partial" bores is shown in FIGS. 7A and 7B. Partial bore 701 receives a lead, which is fastened into place via, e.g., spot welding or a threaded fastener which biases the lead at partial bore 703. Partial bore 705 receives a threaded fastener (such as, e.g., threaded fastener 143), which secures contact block 700 to the overall structure.

Returning to FIG. 4, an annular compression disc 196 is fastened to the distal portion of output cap 170 by way of one or more fasteners 195 which penetrate through compression disc 196 and into output cap 170. Compression disc 196 further includes two longitudinal bores 198, which have a relatively smaller circumference than longitudinal bores 188. By this smaller circumference, compression disc 196 compresses o-ring 190, spacer 192, and second o-ring 194 within bores 188. While not intending to be limited to a single theory, it is believed that this arrangement provides a uniform distribution of downward pressure upon d.c. motor 120, thereby acting as a harmonic balancer by minimizing resonance from the operation of d.c. motor 120.

A conduit nipple 199 passes through the annular portion of compression disc 196 and into output cap 170, threadably mating with threads contained therein. An extension conduit in the form of flexible tubing (not shown) may then be mounted on conduit nipple 199, thereby obtaining access to fluid output passage 184. In one embodiment, conduit nipple 199 comprises a single "mushroom head" configuration in which a single circumferential protrusion 201 allows easy removal and fitting of the flexible tubing fluid conduit. Other configurations of conduit nipple 199 are within the grasp of the ordinarily skilled artisan, such as, e.g., multiple circumferential protrusions 201 (known as a "barb" tip).

The completed device 100 is assembled, upon locking together output cap 170 and inner housing cap 136 (i.e., after inner housing cap 136 is fixedly attached to inner housing 112 as described above), by threadably engaging threads 180 on output cap 170 with mating threads 103 formed into the upper end of outer housing 102. One of ordinary skill will appreciate that other means exist to securing output cap 170 to outer housing 102, including an adaptation of the locking configuration described above for locking output cap 170 to housing cap 136. One or more o-rings 182 placed on the outer periphery of output cap 170 (e.g., proximal to threads 180) creates a water-tight seal with outer housing 102. By this arrangement, electrical power flows from controller 16 through electrical conduit 20 to output contact blocks 176, input contact blocks 146, output contact blocks 142 and, finally, to input terminals 124, which provides power directly to d.c. motor 120.

Fluid passes through filter screen 106 into inner chamber 110 of bottom portion 104, drawn into the groundwater sampling device by water impeller 122 upon rotation of output shaft 118 by motor 120. From the inner chamber 110, fluid passes through grooves 105, advantageously increasing the pressure of the fluid stream, and into a clearance gap 125. Clearance gap 125 is established by diameter selection between the inner diameter of outer housing 102 and the outer diameter of inner housing 112. Clearance gap 125 defines a water passage which upwardly receives groundwater in the direction of the arrows towards output cap 170 and fluid conduit 172. Water drawn in this fashion will proceed through conduit nipple 199 to attached flexible tubing leading to the surface (not shown).

Simple replacement of d.c. motor 120 may be accomplished by: a) unscrewing output cap 170 from outer housing 102; b) removing impeller 122 from output shaft 118; c) unlocking (by twisting, and then pulling) output cap 170 from inner housing cap 136; and d) the disposable sub-assembly includes inner housing cap 136 fixedly attached to inner housing 112 (which includes, inter alia, the spent d.c. motor 120). The procedure is reversed to install the new sub-assembly containing a new d.c. motor 120.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A replaceable motor module for a groundwater sampling device, the replaceable motor module comprising:
    an inner housing defined by a cylindrical shape and comprising a first alignment pin;
    a DC-operated electric motor positionable within said inner housing, said motor comprising a first set of electrical input terminals, an output shaft capable of downwardly extending through a sealed hole in the inner housing, and a first alignment groove for mating with the first alignment pin of the inner housing;
    an inner housing cap comprising a first set of electrical output terminals and a second set of electrical input terminals, and wherein the inner housing cap is pressingly engageable with the inner housing; and
    an output cap comprising a second set of electrical output terminals and a set of leads, and wherein the output cap is pressingly engageable with the inner housing cap,
    wherein the output cap is capable of being pressingly engaged with the inner housing cap by twisting the output cap relative to the inner housing cap, and
    wherein, when the inner housing cap is pressingly engaged with the inner housing and the output cap is pressingly engaged with the inner housing cap, the set of leads is in electrical communication with the first set of electrical input terminals.

2. The replaceable motor module of claim 1, further comprising an annular spacer positioned below a bottom of the motor, wherein the output shaft extends through the center of the annular spacer.

3. The replaceable motor module of claim 2, further comprising one or more springs positioned between the annular spacer and a base of the inner housing, wherein the one or more springs exert a longitudinal force against the annular spacer towards the motor.

4. The replaceable motor module of claim 1, further comprising:
    a second alignment groove positioned on a inside surface of the inner housing; and
    a second alignment pin positioned on the inner housing cap, wherein the second alignment groove is capable of mating with the second alignment pin and, upon mating, aligns the first set of electrical input terminals with the first set of electrical output terminals.

5. The replaceable motor module of claim 1, wherein one or more bores partially penetrate the second set of electrical input terminals and the first set of electrical output terminals, and wherein the second set of electrical input terminals and the first set of electrical output terminals are secured to the inner housing cap by screws inserted into the one or more bores.

6. The replaceable motor module of claim 1, further comprising securing means to secure the second set of electrical input terminals and the first set of electrical output terminals to the inner housing cap without fully penetrating the second set of electrical input terminals or the first set of electrical output terminals.

7. The replaceable motor module of claim 1, wherein one or more bores partially penetrate the second set of electrical input terminals and the first set of electrical output terminals, and wherein the second set of electrical input terminals and the first set of electrical output terminals are in electrical and mechanical communication by means of an electrical conduit secured to the one or more bores.

8. The replaceable motor module of claim 1, further comprising:
    a bottom portion comprising:
        at a distal end, a filter screen for receiving groundwater from a groundwater source, and
        at a proximal end, a circumferential ridge defining an interior chamber, the circumferential ridge containing a plurality of grooves;
    wherein the inner housing comprises a base;
    the circumferential ridge abutting the base of the inner housing such that the grooves define a pathway for the groundwater to flow from the interior chamber.

* * * * *

UNITED STATES PATENT AND TRADEMARK OFFICE
CERTIFICATE OF CORRECTION

| | | |
|---|---|---|
| PATENT NO. | : 9,450,467 B2 | |
| APPLICATION NO. | : 13/826589 | |
| DATED | : September 20, 2016 | |
| INVENTOR(S) | : Craig Intelisano | |

It is certified that error appears in the above-identified patent and that said Letters Patent is hereby corrected as shown below:

Title Page, item (73), Assignee:, "SUMMIN HOLDING COMPANY, LLC" should read
-- SUMMIT HOLDING COMPANY, LLC --

Signed and Sealed this
Twentieth Day of December, 2016

Michelle K. Lee
*Director of the United States Patent and Trademark Office*